(12) United States Patent
McLaughlin

(10) Patent No.: US 9,781,237 B2
(45) Date of Patent: Oct. 3, 2017

(54) DUAL CONNECTOR COUPLING FOR ACCESSORY DEVICE AND ELECTRONIC DEVICE USING THE SAME

(71) Applicant: Google Technology Holdings LLC, Mountain View, CA (US)

(72) Inventor: Michael David McLaughlin, San Jose, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 549 days.

(21) Appl. No.: 14/147,032

(22) Filed: Jan. 3, 2014

(65) Prior Publication Data

US 2015/0147913 A1 May 28, 2015

Related U.S. Application Data

(60) Provisional application No. 61/909,469, filed on Nov. 27, 2013.

(51) Int. Cl.
| | | |
|---|---|---|
| *H04R 25/00* | (2006.01) | |
| *H04M 1/02* | (2006.01) | |
| *H01R 24/58* | (2011.01) | |
| *H04M 1/05* | (2006.01) | |

(52) U.S. Cl.
CPC ........... *H04M 1/0274* (2013.01); *H01R 24/58* (2013.01); *H01R 2201/16* (2013.01); *H04M 1/05* (2013.01)

(58) Field of Classification Search
CPC . H01R 2201/16; H01R 24/58; H04M 1/0274; H04M 1/05; H04R 2420/00–2420/09

USPC .... 381/58, 71.1–71.12, 71.6, 74, 75, 93, 94, 381/194.1, 384, 385, 394, 123, 94.1; 439/188, 489, 668–669, 218, 620.15, 638, 439/660; 200/51.09, 51.1

See application file for complete search history.

(56) References Cited

U.S. PATENT DOCUMENTS

| | | | |
|---|---|---|---|
| 6,007,228 A * | 12/1999 | Agarwal | G06F 1/1632 |
| | | | 361/679.41 |
| 6,928,175 B1 * | 8/2005 | Bader | G06F 3/165 |
| | | | 381/123 |
| 7,270,554 B2 | 9/2007 | Corey et al. | |
| 7,529,379 B2 | 5/2009 | Zurek et al. | |
| 7,961,895 B2 | 6/2011 | Wu et al. | |
| 8,223,986 B2 * | 7/2012 | Sander | H04R 1/1083 |
| | | | 381/122 |
| 8,254,592 B2 | 8/2012 | Sander et al. | |

(Continued)

FOREIGN PATENT DOCUMENTS

WO 2009066124 A1 5/2009

*Primary Examiner* — Vivian Chin
*Assistant Examiner* — Friedrich W Fahnert
(74) *Attorney, Agent, or Firm* — Brake Hughes Bellermann LLP

(57) ABSTRACT

An electronic device includes an analog connector and a digital connector. The analog connector has one or more analog signal contacts and at least one other contact. A signal detector detects signals at the other contact. A switch is coupled to the other contact to, where analog signals are at the other contact, to cause the switch to transition a connection to other contact from a common node of the device to a signal node of the device, thereby allowing a user to use either a four-wire accessory device or five-wire accessory device with a four-wire analog connector.

17 Claims, 8 Drawing Sheets

(56) References Cited

U.S. PATENT DOCUMENTS

| | | | |
|---|---|---|---|
| 2001/0053228 A1* | 12/2001 | Jones | G10K 11/1788 |
| | | | 381/71.6 |
| 2005/0124191 A1 | 6/2005 | Stanton et al. | |
| 2008/0280653 A1 | 11/2008 | Ma et al. | |
| 2009/0130910 A1* | 5/2009 | Inha | H03K 17/687 |
| | | | 439/638 |
| 2012/0148062 A1 | 6/2012 | Scarlett et al. | |
| 2012/0237044 A1* | 9/2012 | Poulsen | H04R 1/1041 |
| | | | 381/58 |
| 2013/0108064 A1* | 5/2013 | Kocalar | G01B 31/318572 |
| | | | 381/58 |
| 2013/0336506 A1* | 12/2013 | Prentice | H04R 3/00 |
| | | | 381/309 |
| 2014/0329416 A1* | 11/2014 | Golko | H01R 29/00 |
| | | | 439/676 |
| 2015/0358719 A1* | 12/2015 | Mackay | G06F 11/3051 |
| | | | 381/384 |
| 2016/0127815 A1* | 5/2016 | Ookuri | H04R 1/06 |
| | | | 381/119 |

\* cited by examiner

DUAL CONNECTOR COUPLING FOR ACCESSORY DEVICE AND ELECTRONIC DEVICE USING THE SAME

CROSS REFERENCE TO PRIOR APPLICATIONS

This application claims priority and benefit under 35 U.S.C. §119(e) from U.S. Provisional Application No. 61/909,469, filed Nov. 27, 2013, which is incorporated by reference for all purposes.

BACKGROUND

1. Technical Field

This disclosure relates generally to devices, and more particularly to couplers for accessory devices.

2. Background Art

Mobile communication devices, such as mobile telephones, mobile computers, multimedia players, gaming devices, tablet computers, and the like, are generally equipped with one or more connectors that are used as interfaces for accessory devices. Illustrating by example, a "smartphone" may include an audio connector so that a headset and microphone can be attached. These connectors are generally at least somewhat standardized so that a generic accessory, such as ear buds with a microphone, can work with a variety of devices.

As mobile communication devices get smaller in size and offer more features, it can become difficult to provide sufficient space on the body of the device for new connectors when new accessory devices are developed. Accordingly, a device with a standard connector or two may have a lessened versatility and applicability to new accessory devices when those accessory devices use a connector other than the one (or two) standard connectors disposed along the device. It would be advantageous to be able to use traditional electronic devices with new accessory devices.

Figure 1:
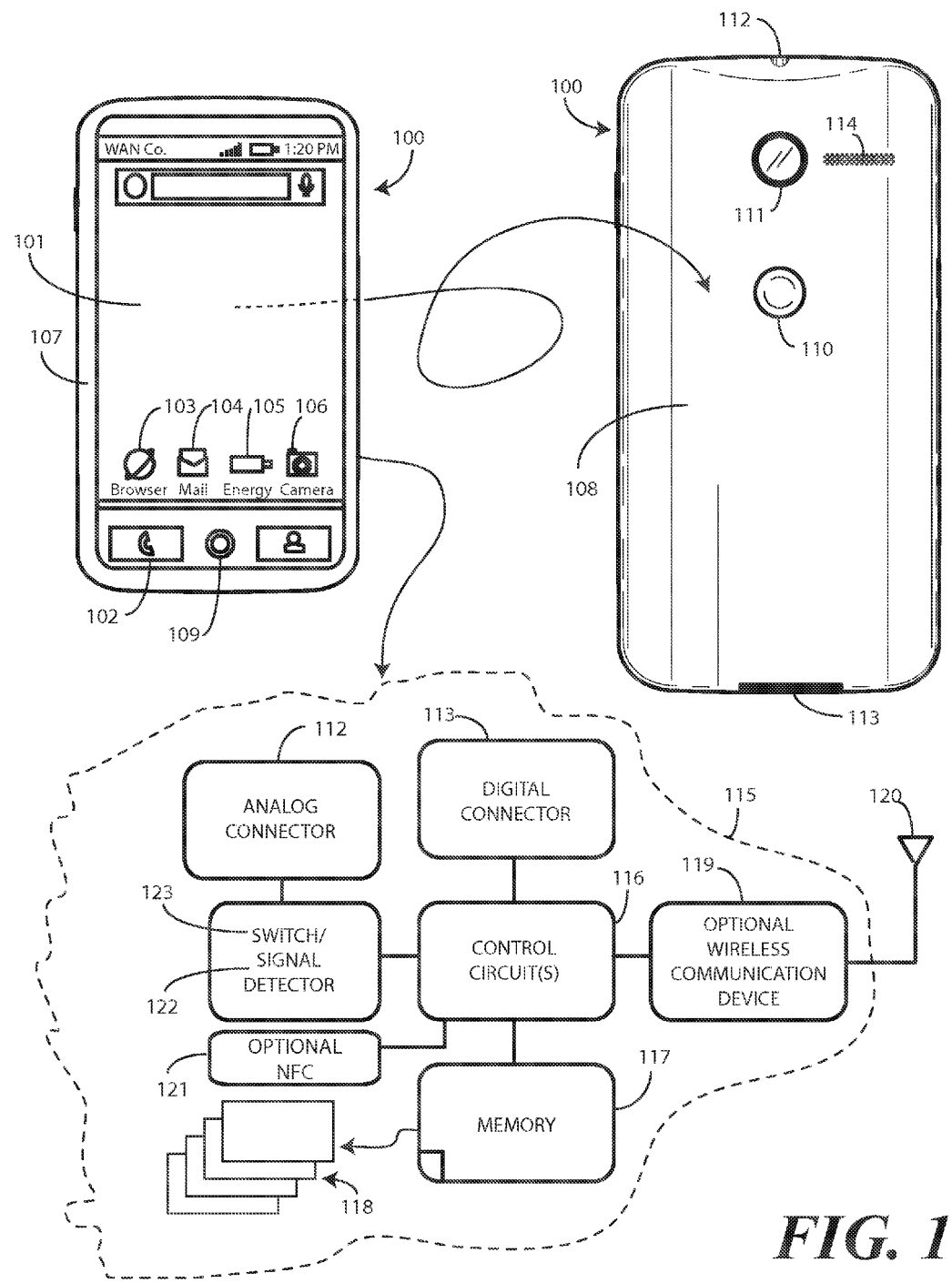
FIG. 1 illustrates an electronic device configured in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to electronic device operations with one or more connectors. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of electronic device operations with one or more connectors and accessory devices as described herein. The non-processor circuits may include, but are not limited to, a radio receiver, a radio transmitter, signal drivers, clock circuits, power source circuits, and user input devices. As such, these functions may be interpreted as steps of a method to perform accessory device interface operations. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion.

For example, talking about a device (10) while discussing figure A would refer to an element, 10, shown in figure other than figure A.

Embodiments of the disclosure provide an electronic device comprising an analog connector and a digital connector. In one embodiment, the analog connector is a standard, four-wire audio connector. In one embodiment, the digital connector is one of a Universal Serial Bus (USB) connector, a mini-USB connector, or a micro-USB connector. An accessory device, operable with the electronic device, also has a connector. In one embodiment, the accessory device comprises noise canceling ear buds or headphones, and its connector is a five-wire connector, with two microphone contacts, two loudspeaker contacts, and a common contact.

In one embodiment, the connector of the accessory device comprises a first connector to couple to the analog connector of the electronic device and a second connector to couple to the digital connector of the electronic device. In one embodiment, the first connector is a four-wire connector, with a first loudspeaker contact, a second loudspeaker contact, a first microphone contact, and a second microphone contact. The second connector then includes at least one contact which is to couple to a common node of the electronic device.

As the analog connector of the electronic device is a four-wire connector in one embodiment, a detection system is included within the electronic device so that it is operable with both conventional four-wire accessory devices and the five-wire accessory device configured in accordance with one or more embodiments of the disclosure. In one embodiment, a signal detector is coupled to the "common" contact, i.e., a fourth contact, of the four-wire analog connector. A switch is operable with a control circuit to transition the fourth contact of the four-wire analog connector from a common node of the electronic device to a signal node of the electronic device as a function of whether analog signals are present at the fourth contact. Accordingly, when a conventional accessory having a return line at the fourth contact is coupled to the analog connector of the electronic device, the switch couples the fourth contact to the common node of the electronic device and the conventional accessory works normally. However, when a five-wire accessory device configured in accordance with one or more embodiments of the disclosure is coupled to the electronic device, in one embodiment a microphone input is tied to the fourth contact. The signal detector thus detects analog signals present on the fourth contact. The control circuit then causes the switch to transition a connection to the fourth contact to a signal node of the electronic device. The electronic device can then work with new and improved accessory devices, such as noise canceling headsets, without needing a new connector that differs from those already deployed on the device.

Turning now to FIG. 1, illustrated therein is one embodiment of an electronic device 100 configured in accordance with one or more embodiments of the disclosure. The explanatory electronic device 100 of FIG. 1 is shown as a smart phone for illustrative purposes. However, it will be obvious to those of ordinary skill in the art having the benefit of this disclosure that other electronic devices may be substituted for the explanatory smart phone of FIG. 1. For example, the electronic device 100 may be configured as a palm-top computer, a tablet computer, a gaming device, wearable computer, a media player, or other device.

This illustrative electronic device 100 includes a touch-sensitive display 101. In one embodiment, the touch-sensitive display 101 is touch-sensitive and is configured as an organic light emitting diode display. However, an organic light emitting diode display is one type of touch-sensitive display 101 suitable for use with the disclosure, and will accordingly be used for explanatory purposes in this disclosure. However, it should be noted that other types of displays, including liquid crystal displays, would be obvious to those of ordinary skill in the art having the benefit of this disclosure.

The explanatory electronic device 100 of FIG. 1 includes two housing members. An upper housing member 107 is disposed about the periphery of the touch-sensitive display 101. A lower housing member 108 forms the backside of the electronic device 100 in this illustrative embodiment. Features can be incorporated into the housing members, including optional control buttons 109,110, an optional camera 111, and an optional speaker port 114.

In one embodiment, the electronic device 100 includes an analog connector 112 and a digital connector 113. In this illustrative embodiment, the analog connector 112 is disposed on a first edge, i.e., the top edge, of the electronic device 100, while the digital connector 113 is disposed on a second edge opposite the first edge, which is the bottom edge in this embodiment. The analog connector 112 comprises one or more signal contacts to convey analog signals from an accessory device. In one embodiment, the analog connector 112 comprises at least one common contact as well, which serves as contact to a reference node or "ground node" of the electronic device 100. One embodiment of the analog connector 112 will be described in greater detail below with reference to FIG. 2.

The digital connector 113, shown in FIG. 1 as being separate from the analog connector 112, comprises one or more contacts for conveying digital data from an accessory device. As with the analog connector 112, in one embodiment the digital connector includes at least one common contact serving as a contact to the reference node or ground node of the electronic device 100.

Note the contact of the analog connector 112 coupled to the common node or ground node of the electronic device 100 and the contact of the digital connector 113 connected to the common node or ground node of the electronic device 100 may be coupled to the same node or different nodes. For example, in one embodiment, there is only one reference or ground node of the electronic device and the contact of the analog connector 112 coupled to the common node or ground node of the electronic device 100 and the contact of the digital connector 113 connected to the common node or ground node of the electronic device 100 will be coupled to this single node. However, in some designs, as is known in the art, it is common to have an "analog ground" and a "digital ground" that are coupled together with a low impedance path. For example, to keep digital noise and other artifacts from compromising sensitive analog circuits, frequently digital circuit components are connected to one reference node, i.e., the digital ground, while the analog circuits are coupled to a second reference node, i.e., the analog ground. These two reference nodes are then coupled by a low-impedance path. Accordingly, as used herein a "common node" refers to either the single common node of the electronic device 100 when a single reference is used, or to either the analog reference node or digital reference node where both are used as both are generally considered to be a common reference node within the electronic device 100 due to the use of the low-impedance connection path.

A block diagram schematic 115 of the electronic device 100 is also shown in FIG. 1. Illustrated in the block diagram schematic 115 of the electronic device 100 are the analog connector 112 and the digital connector 113 described above.

In one embodiment, the electronic device 100 includes a control circuit 116, which can include one or more processors. The control circuit 116 can be responsible for performing the various functions of the electronic device 100. The control circuit 116 can be a microprocessor, a group of processing components, one or more Application Specific Integrated Circuits (ASICs), programmable logic, or other type of processing device. The control circuit 116 can be operable with the various components of the electronic device 100. For example, in one embodiment the control circuit 116 comprises one or more circuits to send or receive analog signals through the analog connector 112 and digital signals through the digital connector 113.

The control circuit 116 can be configured to process and execute executable software code to perform the various functions of the electronic device 100. A storage device, such as memory 117, stores the executable software code used by the control circuit 116 for device operation. The executable software code used by the control circuit 116 can be configured as one or more modules 118 that are operable with the control circuit 116. Such modules 118 can store instructions, control algorithms, and so forth. The instructions can instruct processors or control circuit 116 to perform the various steps of the methods described herein.

In this illustrative embodiment, the electronic device 100 also includes a communication circuit 119 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, and other networks. The communication circuit 119 can include wireless communication circuitry, one of a receiver, a transmitter, or transceiver, and one or more antennas 120.

In one embodiment, the electronic device 100 also includes an optional near field communication circuit 121. The near field communication circuit 121 can be operable with the control circuit 116 to permit the electronic device 100 to communicate with near field communication object. For example, in one embodiment described below, the near field communication circuit 121 can be used to detect an accessory device being connected to the electronic device 100. This application for the near field communication circuit 121 is illustrative only, as others will be obvious to one of ordinary skill in the art having the benefit of this disclosure.

In one embodiment, the near field communication circuit 121 is operable with a wireless near field communication transceiver, which in one embodiment is a form of radio-frequency device configured to send and receive radio-frequency data to remote near field communication devices or accessory devices. The near field communication circuit 121 can have its own near field communication circuit controller in one or more embodiments to wirelessly communicate with a variety of near field communication devices employing various near field communication technologies and protocols. The near field communication circuit 121 can include—as an antenna—a communication coil that is configured for near-field communication at a particular communication frequency. In one embodiment, the communication coil is wrapped about a ferrite or other material. The term "near-field" as used herein refers generally to a distance of less than about a meter or so. The communication coil communicates by way of a magnetic field emanating from the communication coil when a current is applied to the coil. A communication oscillator applies a current waveform to the coil. The near field communication circuit controller may further modulate the resulting current to transmit and receive data.

In one embodiment, the electronic device 100 includes a signal detector 122 and a switch 123 that are operable with either the analog connector 112 or the digital connector 113. In the illustrative embodiment of FIG. 1, the signal detector 122 and the switch 123 are operable with the analog connector 112. As will be described in more detail below with reference to FIGS. 5-7, in one embodiment the signal detector 122 is operable to detect analog signals at one or more contacts of the analog connector 112. The switch 123 is operable to transition a connection to one or more contacts of the analog connector 112 between a common node of the electronic device 100 and a signal node of the electronic device 100, in one embodiment, when the signal detector 122 detects analog signals at one or more contacts of the analog connector 112.

Figure 2:
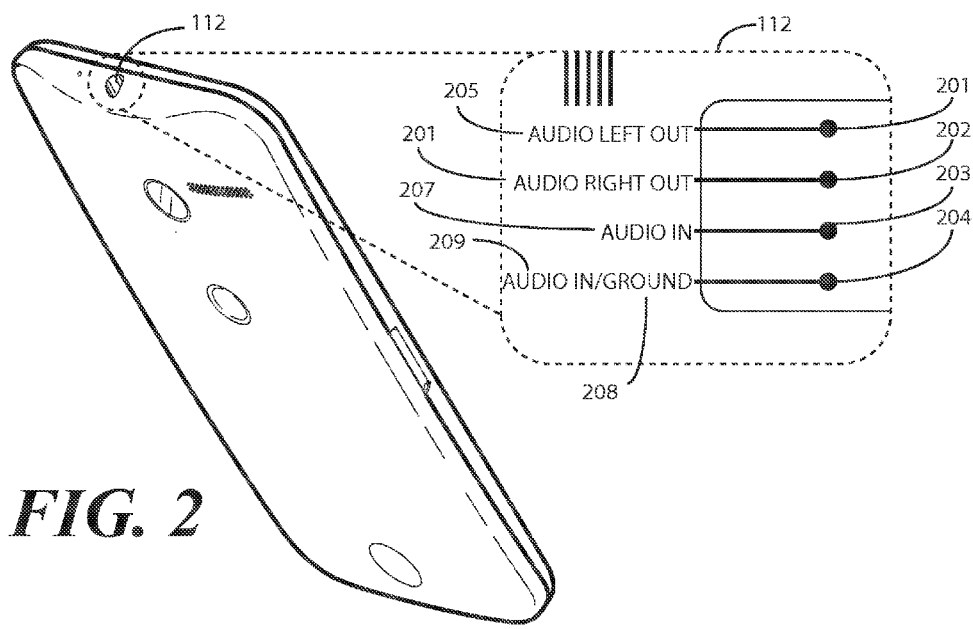
FIG. 2 illustrates an explanatory electronic device, along with one explanatory analog connector, configured in accordance with one or more embodiments of the disclosure.

Turning now to FIG. 2, illustrated therein is the electronic device 100 of FIG. 1 with one embodiment of the analog connector 112 shown in more detail. In the illustrative embodiment of FIG. 2, the analog connector 112 comprises one or more analog signal contacts 201-203 and at least one other contact 204. The illustrative analog connector 112 of FIG. 2 is shown as a 3.5-millimeter audio jack that includes four contacts. The four contacts are three analog signal contacts, i.e., contacts 201-203, and a single common node contact, i.e., contact 204. A first contact 201 is coupled to an audio left out signal line 205, while a second contact 202 is coupled to an audio right out signal line 206. A third contact 203 is coupled to an audio in signal line 207, while the fourth contact 204 is a dual contact that can be switched between a common node 208 or ground of the electronic device 100 and a signal node 209 of the electronic device by the switch (123).

In one embodiment, this occurs as a function of whether analog signals are present at the fourth contact 204. For example, in one embodiment, the signal detector (122) is coupled to the fourth contact. The switch (123) can also be coupled to and/or operable with, the fourth contact 204. Where the signal detector (122) detects analog signals at the fourth contact 204, the control circuit (116) can cause the switch (123) to transition from a connection between the fourth contact 204 and a common node 208 of the electronic device 100 to a connection between the fourth contact 204 and signal node 209 of the electronic device 100. Where the signal detector (122) fails to detect analog signals present at the fourth contact 204, the control circuit (116) can cause the switch (123) to couple the fourth contact 204 to the common node 208 of the electronic device 100. Said differently, in one embodiment the control circuit (116) is to cause the switch (123) to connect the fourth contact 204 to the common node 208 whenever analog signals are not at the fourth contact 204 as determined by the signal detector (122).

Figure 3:
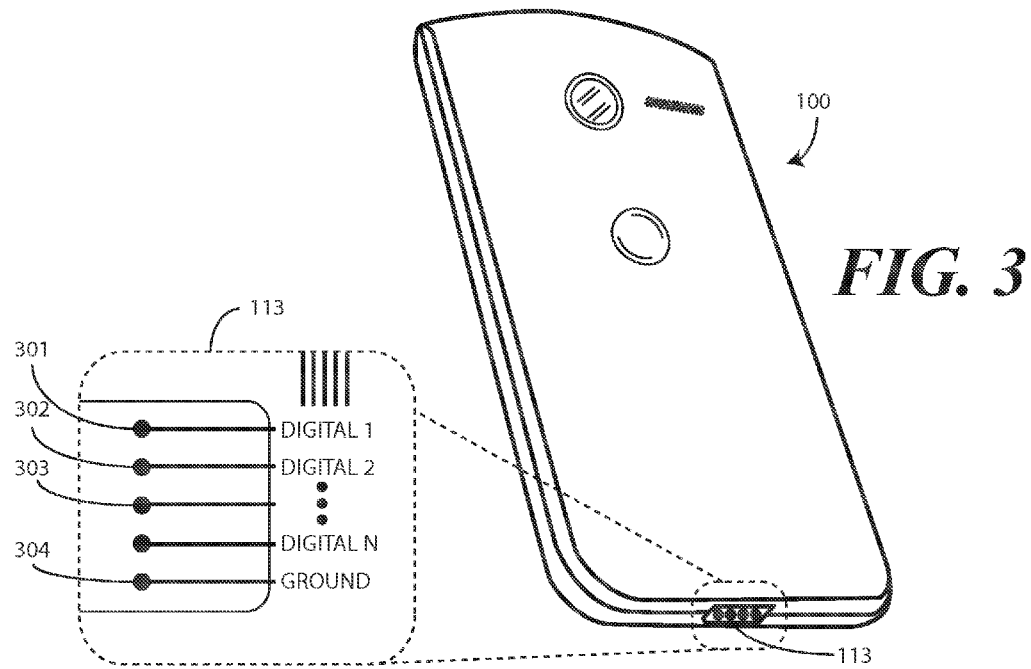
FIG. 3 illustrates an explanatory electronic device, along with one explanatory digital connector, configured in accordance with one or more embodiments of the disclosure.

Turning now to FIG. 3, illustrated therein is the electronic device 100 of FIG. 1 with one embodiment of the digital connector 113 shown in more detail. The digital connector 113 of this embodiment includes a plurality of digital signal contacts 301, 302, 303 and a common contact 304. The digital connector 113 of this illustrative embodiment is configured as a micro-USB connector. Those of ordinary skill in the art having the benefit of this disclosure will recognize that digital connection configurations other than USB can be substituted for the micro-USB connector of FIG. 3. By comparing FIG. 2 and FIG. 3, one can see that the digital connector 113 and the analog connector 112 are separate in this illustrative embodiment, as each is disposed on an opposite end of the electronic device 100.

Figure 4:
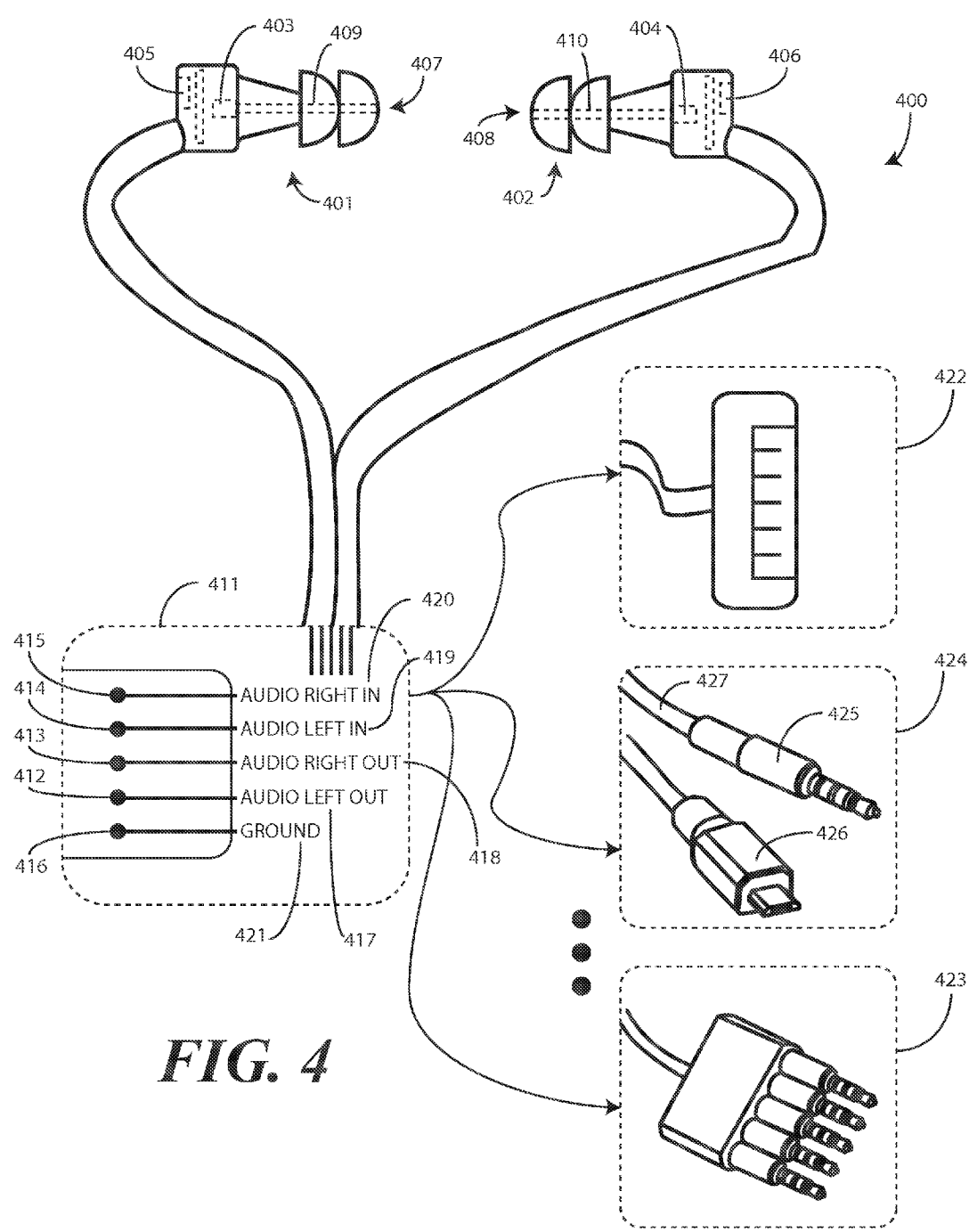
FIG. 4 illustrates one explanatory accessory device configured in accordance with one or more embodiments of the disclosure.

Turning now to FIG. 4, illustrated therein is one example of an accessory device 400 configured in accordance with one or more embodiments of the disclosure. The illustrative accessory device 400 is configured a noise canceling ear buds having a left ear bud 401 and a right ear bud 402. While shown as ear buds, the accessory device 400 could be configured as headphones, earpieces, or in other ways as well.

While some noise canceling systems have processors, batteries, and other complex circuitry to provide noise-canceling features, advantageously the noise canceling ear buds of FIG. 4 are designed to be inexpensive and convenient for the user. When a user spends hundreds of dollars on a sophisticated electronic device such as a smartphone, they may become frustrated when told that they have to spend several hundred dollars more for accessory devices. Accordingly, the accessory device 400 of FIG. 4 is simple in that all active noise cancelation circuits can be disposed in the electronic device (100) rather than in the accessory device 400 itself.

Each of the left ear bud 401 and the right ear bud 402 includes a loudspeaker 403,404 and a microphone 405,406. FIG. 4 provides an enlarged side plan view of the left ear bud 401 and the right ear bud 402 to illustrate the positional placement of some of the internal elements. For example, the left ear bud 401 includes an internal loudspeaker 403 coupled to an audio port 407 disposed at the end of a trunk 409. An integral microphone 405 is to receive ambient noise from outside the left ear bud 401 when the left ear bud 401 is placed within a user's ear. Similarly, the right ear bud 402 includes an internal loudspeaker 404 coupled to an audio port 408 disposed at the end of another trunk 410. An integral microphone 406 is to receive ambient noise from outside the right ear bud 402 when the left ear bud 402 is placed within a user's ear. In one or more embodiments, the microphones 405,406 comprise omni-directional electret microphone, and the loudspeakers 403,404 comprise balanced armature loudspeakers.

In one embodiment, the audio ports 407,408 are arranged relative to the external housing, so as to exit the left ear bud 401 and right ear bud 402, respectively, into a user's ear canal when the left ear bud 401 and right ear bud 402 are at least partially inserted into the user's ears. The external housing of each ear bud can be arranged as a pair of cascading (i.e. laterally offset in the direction of insertion) semi-spheres made of a pliable material having their convex curved surface which faces toward the ear canal upon insertion. When placed within the ear canal of the user, the semi-spheres made of pliable material will flex so as to conform to the shape of the ear canal, thereby producing a seal, which limits the amount of sound that will traverse across the external surface of the semi-spheres. The sealing generally does not affect the transmission of sound via the internal audio porting formed from trunks 409,410, as they travel through the semi-spheres proximate their center.

The microphones 405,406 and loudspeakers 403,404 are coupled via wire to a connector 411 of the accessory device 400. More specifically, the microphones 405,406 and loudspeakers 403,404 are coupled to a plurality of analog contacts of the connector 411. A first loudspeaker 403 is coupled to a first analog contact 412, shown here as an audio left out signal line 417. The second loudspeaker 404 is coupled to a second analog contact 413, which is shown as an audio right out signal line 418. A first microphone 405 is coupled to a third analog contact 414, which is shown as an audio left in signal line 419, while the second microphone 406 is coupled to the fourth analog contact 415, which is shown as an audio right in signal line 420. The accessory device also has a common line 421, which is connected to a common contact 416 of the connector 411. Accordingly, the connector 411 is a five-wire connector. The plurality of analog contacts 412,413,414 comprises four of the five contacts and the common contact 416 comprises one of the five contacts.

In one embodiment, to provide noise cancelation operations, the two microphones 405,406 deliver ambient noise signals through the third analog contact 414 and fourth analog contact 415 to the control circuit of an electronic device that is providing audio output to the loudspeakers 403,404 through the first analog contact 412 and the second analog contact 413, respectively. The control circuit can determine the amount, magnitude, and/or ambient noise signals and then drive a corresponding signal that is 180 degrees out of phase with the noise signals to cancel the ambient noise at the audio ports 407,408. The trouble with doing this in the electronic device is that five wires are needed. Accordingly, the connector 411 of FIG. 4 will not couple to the analog connector (112) of the electronic device (100) of FIGS. 1-3. Embodiments of the present disclosure advantageously provide solutions to this very problem without the need of adding a five-wire connector to the electronic device (100). As noted above, electronic devices are becoming smaller and smaller and adding a new connector to accommodate the accessory device 400 of FIG. 4 can be problematic and costly, or even impossible. Moreover, substituting a five-wire connector for the four-wire analog connector (112) described above is also problematic in that legacy accessory devices will no longer be operable with the electronic device (100). Embodiments of the disclosure provide a solution to this issue as well. One solution will be described with reference to FIGS. 5-7 below.

Prior to leaving FIG. 4, it should be noted that the connector 411 of the accessory device 400 can be configured in a variety of ways. For example, in one embodiment the connector 411 comprises a five-wire female connector 422. In another embodiment, the connector 411 comprises a five-wire male connector 423. In yet another embodiment, the connector 411 can be configured as two connectors 424. For example, in one embodiment the two connectors 424 comprise a first connector 425 and a second connector 426 that is separable by a wire 427 from the first connector 425. In one embodiment, the first connector 425 can be configured as a 3.5-millimeter audio jack while the second connector 426 is configured as a micro-USB connector. In one embodiment, the plurality of analog contacts 412,413,414, 415 is disposed along the first connector 425 while the common contact 416 is disposed along the second connector 426. In one embodiment, the first connector 425 is to couple to an analog connector (112) of an electronic device (100), while the second connector 426 is to couple to a digital connector (113) of the electronic device (100).

Figure 5:
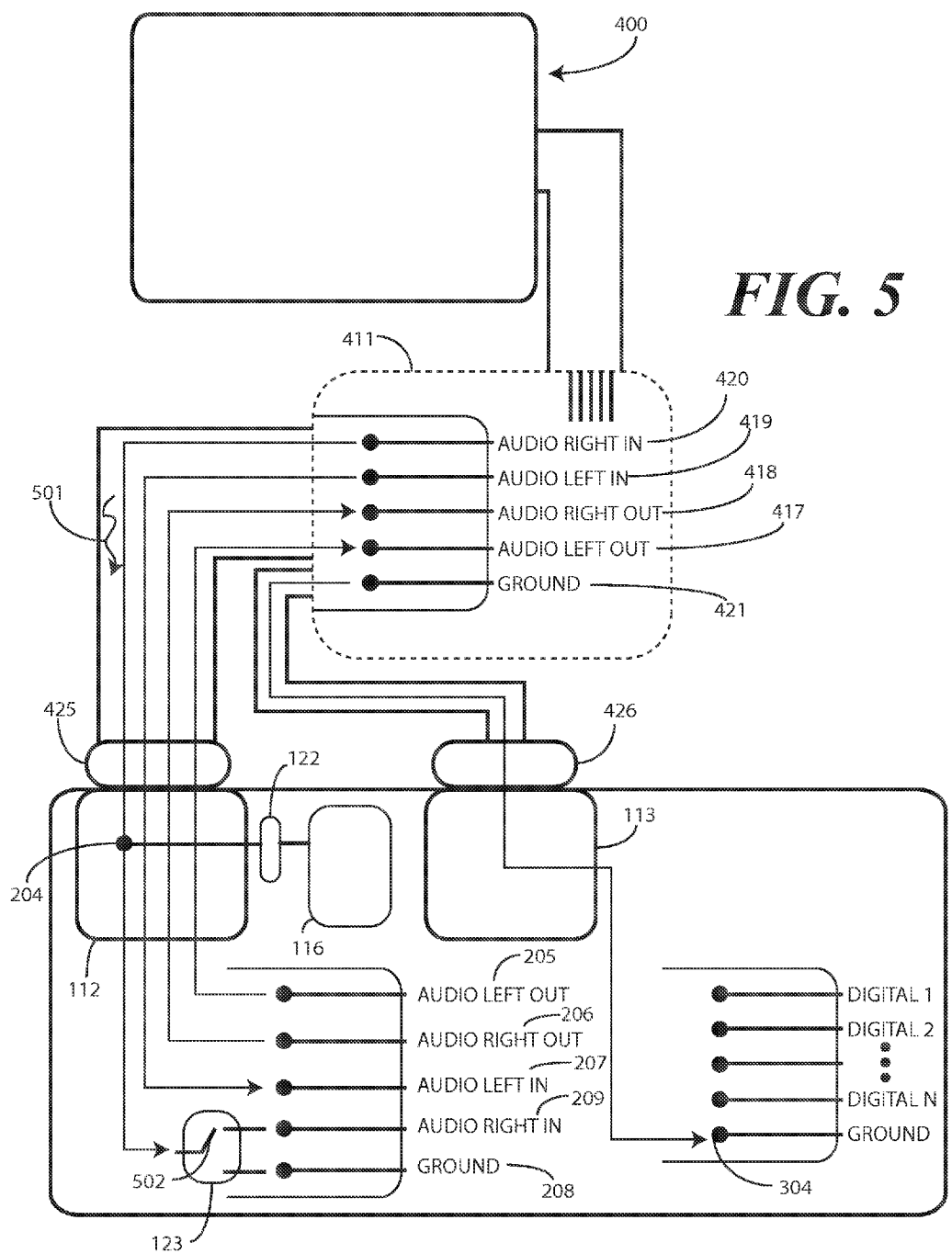
FIG. 5 illustrates one explanatory system configured in accordance with one or more embodiments of the disclosure.

Turning now to FIG. 5, illustrated therein is one example of a system 500 configured in accordance with one or more embodiments of the disclosure. In FIG. 5, the accessory device 400 has a connector 411 that is configured as a first connector 425 and a second connector 426. The electronic device 100 to which the accessory device 400 is connected includes the analog connector 112 and digital connector 113 described above with reference to FIGS. 2 and 3. The electronic device 100 also includes the control circuit 116, signal detector 122, and switch 123 described above with reference to FIG. 3.

As shown in FIG. 5, the first connector 425 of the accessory device 400 is connected to the analog connector 112 of the electronic device 100. Accordingly, the audio right out signal line 418 of the connector 411 of the accessory device 400 is coupled to the audio right out signal line 206 of the analog connector 112 of the electronic device 100. This line can be used to drive a loudspeaker (404) of the accessory device 400. Similarly, the audio left out signal line 417 of the connector 411 of the accessory device 400 is coupled to the audio left out signal line 205 of the analog connector 112 of the electronic device 100. This line can be used to drive another loudspeaker (403) of the accessory device 400. The audio left in line 417 of the connector 411 of the accessory device 400 is coupled to the audio in line 207 of the analog connector 112 of the electronic device 100. These connections through the four-wire analog connector 112 of the electronic device 100 are the same as would be with many commonly available wireless headsets used for hands-free mobile phone operation.

However, the accessory device 400 of FIG. 5 is configured as a noise-canceling headset. Accordingly, it has two microphone inputs to the electronic device 100, not one. In accordance with one embodiment, the second microphone input, shown in FIG. 5 as the audio right in line 420 of the connector 411 of the accessory device 400, is coupled to a fourth contact 204 of the analog connector 112 of the electronic device 100. The fourth contact 204 is referred to as a "switchable contact" because it can be switched between a common node 208 and a signal node 209. The signal detector 122 then detects analog signals 501 at the fourth contact 204 of the analog connector of the electronic device 100. The control circuit 116 then causes the switch 123 to transition a connection 502 to the fourth contact 204 from a common node 208 of the electronic device 100 to a signal node 209 of the electronic device 100. In this embodiment, the signal node 209 comprises an audio input node. In one embodiment, the control circuit 116 causes the switch to transition the connection when the plurality of analog contacts of the connector 411 of the accessory device 400 are coupled to the analog connector 112 of the electronic device 100. Accordingly, the control circuit 116 can receive microphone input from the accessory device and can cancel unwanted components of that input in the audio out lines by applying a signal equal to the unwanted components but 180 degrees out of phase.

Since the connector 411 of the accessory device 400 is a five-wire connector, the return or common line 421 of the connector 411 of the accessory device 400 has no contact in the analog connector 112 to which it can connect since each contact is being used by the analog lines. Accordingly, the common line 421 runs through the second connector 426, which is coupled to the digital connector 113 of the electronic device 100. The common line 421 can therefore couple to a common contact 304 of the digital connector 113 of the electronic device 100. In this way, the five-wire configuration of the connector 411 of the accessory device 400 is accommodated using conventional connectors of the electronic device 100. In one or more embodiments, where digital ground and analog ground are coupled by a low-impedance path, it can be advantageous to keep the low-impedance path below a predetermined threshold for optimal analog signal quality. For example, in one embodiment the low-impedance path is less than 50 micro-ohms in impedance.

Figure 6:
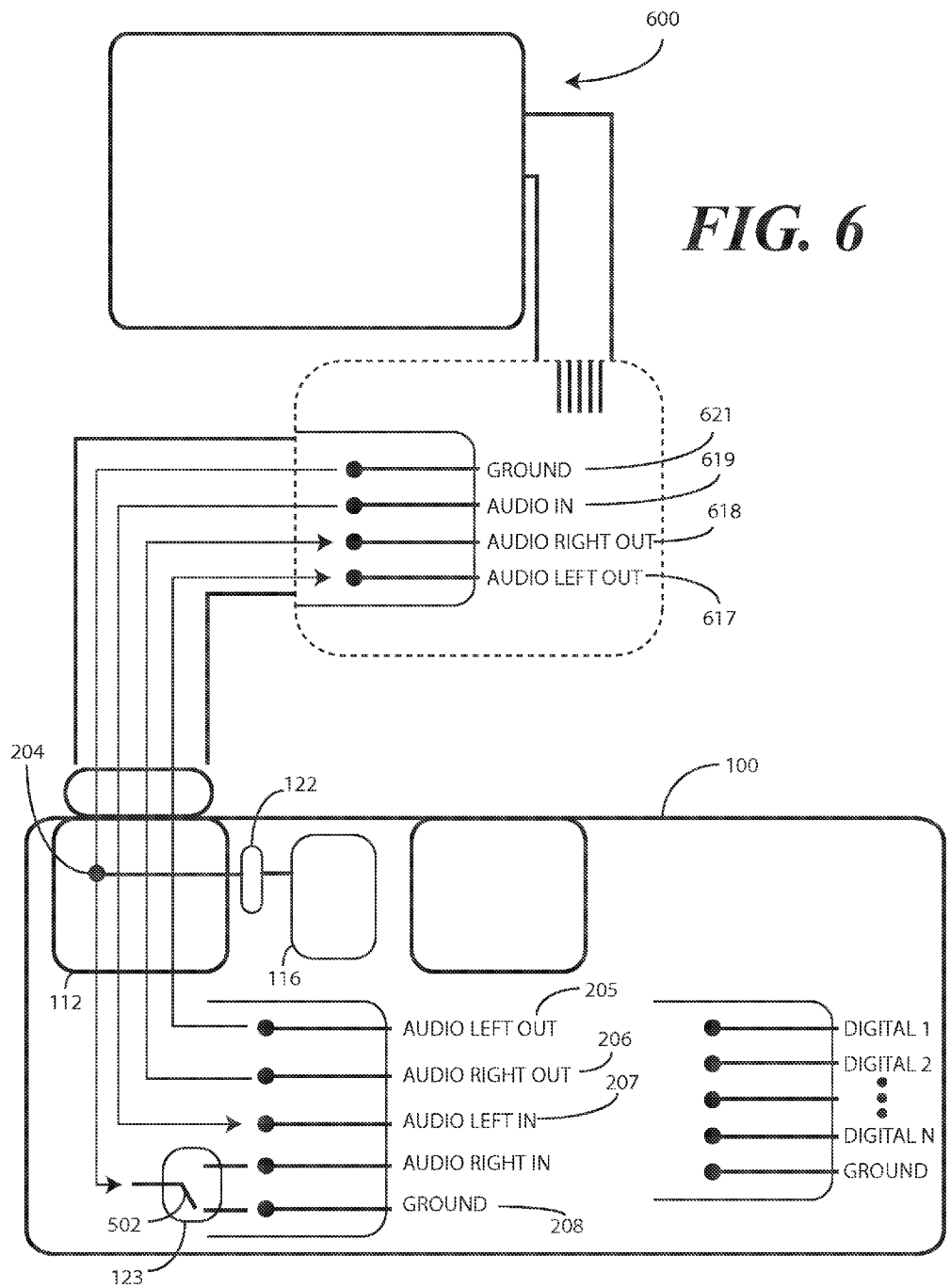
FIG. 6 illustrates another explanatory system configured in accordance with one or more embodiments of the disclosure.

Turning now to FIG. 6, a conventional accessory device 600 is coupled to the electronic device 100. The connector 611 of the conventional accessory device 600 is a four-wire connector and is coupled only to the analog connector 112 of the electronic device 100. Accordingly, the audio right out line 618 of the connector 611 of the conventional accessory device 600 is coupled to the audio right out signal line 206 of the analog connector 112 of the electronic device 100. This line can be used to drive a loudspeaker (not shown) of the conventional accessory device 600. Similarly, the audio left out line 617 of the connector 611 of the conventional accessory device 600 is coupled to the audio left out signal line 205 of the analog connector 112 of the electronic device 100. This line can be used to drive another loudspeaker (not shown) of the conventional accessory device 600. The audio in line 619 of the connector 611 of the conventional accessory device 600 is coupled to the audio in line 207 of the analog connector 112 of the electronic device 100. The common line 621 of the connector 611 of the conventional accessory device 600 is coupled to the fourth contact 204 of the analog connector 112 of the electronic device 100.

The signal detector 122 thus sees no analog signals at the fourth contact 204. The control circuit 116 of this embodiment is to cause the switch 123 to connect the fourth contact 204 to the common node 208 of the electronic device 100 whenever analog signals are not at the fourth contact 204. Accordingly, the control circuit 116 causes the switch 123 to transition a connection 502 to the fourth contact 204 to the common node 208 of the electronic device 100. A user can thus use the conventional accessory device 600 normally.

Figure 7:
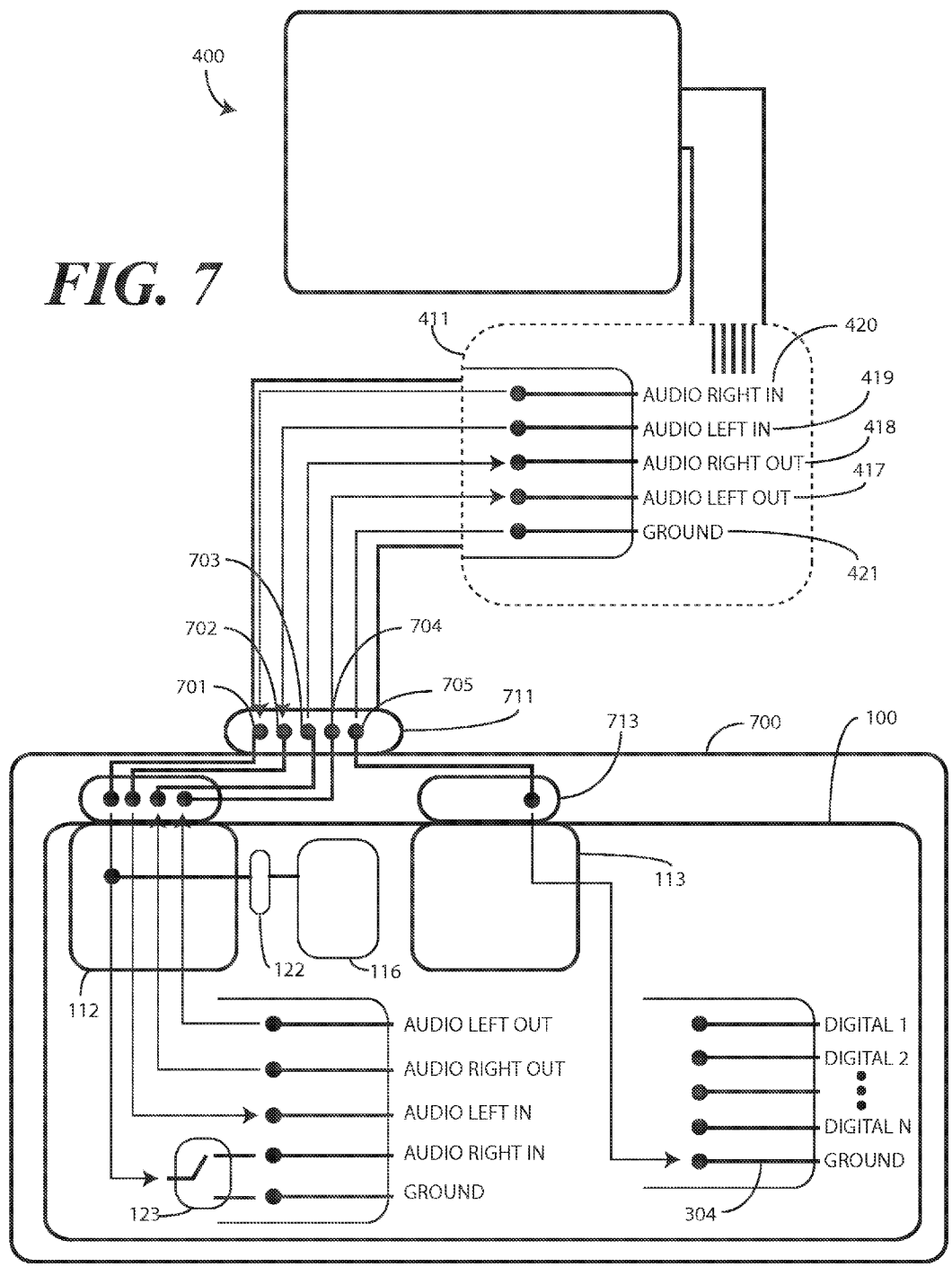
FIG. 7 illustrates another explanatory system configured in accordance with one or more embodiments of the disclosure.

Embodiments of the disclosure contemplate that some users may prefer a single connection between accessory device and electronic device, like that of the conventional accessory device 600 shown in FIG. 6, over the dual connector configuration shown in FIG. 5. Turning now to FIG. 7, illustrated therein is yet another system in accordance with embodiments of the disclosure that provides for a single connection from the accessory device, even when the accessory device is a five-wire connection that does not require reconfiguration of the four-wire analog connector of an electronic device.

As shown in FIG. 7, the electronic device 100 includes the analog connector 112 and digital connector 113 described above with reference to FIGS. 2 and 3. The electronic device 100 also includes the control circuit 116, signal detector 122, and switch 123 described above with reference to FIG. 3. An adapter 700 is mechanically coupled to the electronic device 100. The adapter 700 includes a first connector 712 coupled to the analog connector 112 of the electronic device, a second connector 713 coupled to the digital connector 113 of the electronic device 100, and a third connector 711 to couple to the connector 411 of the accessory device 400. The third connector 711 comprises a plurality of contacts 701, 702, 703, 704 coupled to the first connector 712 and a common contact 705 coupled to the the second connector 713. In the illustrative embodiment of FIG. 7, the adapter 700 is coupled between the accessory device 400 and the electronic device 100.

In one embodiment, the first connector 712 comprises only audio signal contacts. In one embodiment, each audio signal contact is coupled to a corresponding audio signal contact of the third connector 711 on a one to one basis. For example, in the illustrative embodiment of FIG. 7, the first connector comprises contacts 701,702,703,704 for the audio right in line 420, the audio left in line 419, the audio right out signal line 418, and the audio left out signal line 417. Meanwhile, the second connector 713 comprises only common contacts. For example, the common contact 304 of the electronic device 100 is coupled to the common line 421 of the connector 411 of the accessory device 400. Accordingly, a user can leave the adapter 700 coupled to the electronic device 100 and can couple a single connector 411 to the resulting assembly when using an accessory device 400 having a five-wire connector.

In one embodiment, the adapter 700 is configured as a case to at least partially surround the electronic device 100. Such covers can be manufactured from soft materials such as rubber, silicone, or neoprene, and can stretch to fit about the electronic device 100. Alternatively, they can fold about the device, and be manufactured from materials such as leather or plastic. The adapter 700 can partially surround the electronic device 100, or can completely cover the electronic device 100 offering protective features in addition to carrying the first connector 712, the second connector 713, and the third connector 711. Other cover configurations for the adapter 700 will be obvious to those of ordinary skill in the art having the benefit of this disclosure.

To this point, the switch configured to switch to transition a connection of the common contact from a common node of the device to a signal node of the device has been responsive to the signal detector. However, other techniques could be used in place of the signal detector. For example, recall from the discussion of FIG. 1 that in one embodiment an electronic device (100) can be equipped with optional circuit components such as the near field communication circuit (121). This circuit can be used with specially configured accessory devices to determine the status of the switch. For example, if a connector (411) of an accessory device (400) is equipped with a near field communication tag, the near field communication circuit (121) can detect either the accessory device (400) being proximately located with the electronic device (100) or the connector (411) of the accessory device (400) being coupled to the analog connector (112) of the electronic device (100).

Figure 8:
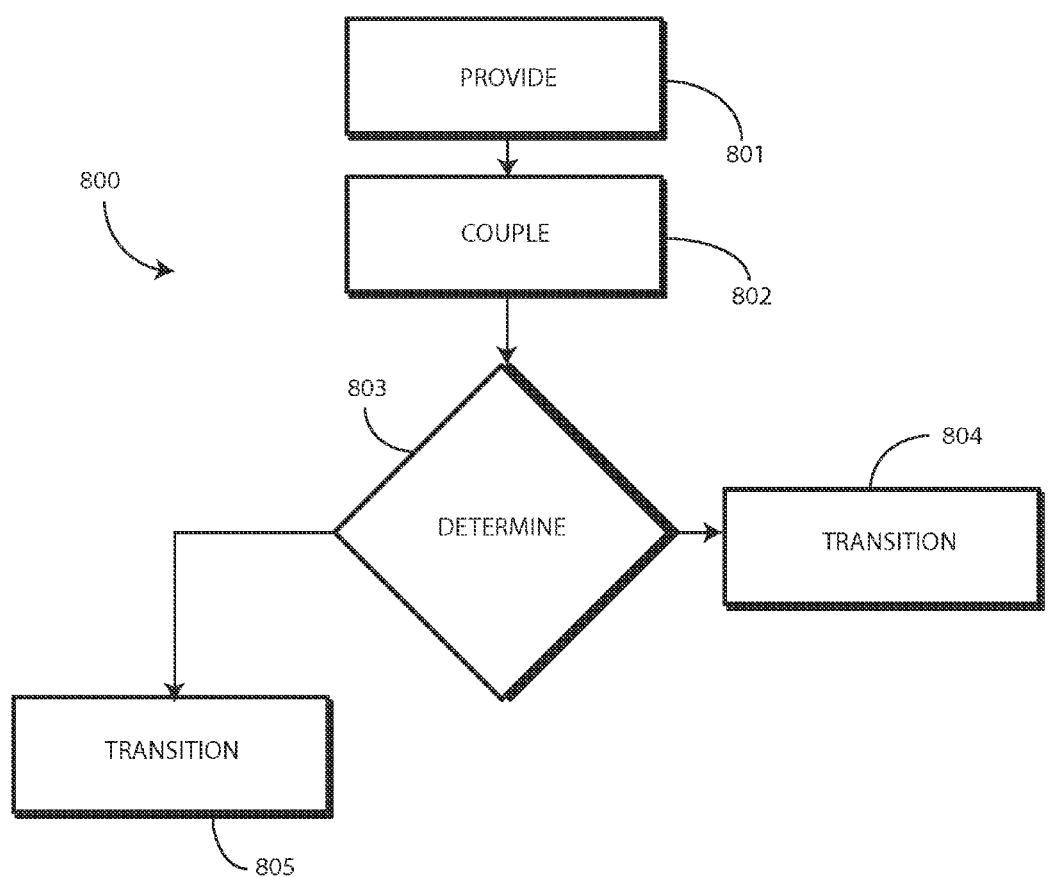
FIG. 8 illustrates an explanatory method of operating an electronic device in accordance with one or more embodiments of the disclosure.

Turning now to FIG. 8, illustrated therein is a general method 800 suitable for use in an electronic device configured in accordance with one or more embodiments of the disclosure. At step 801 an electronic device is provided having two connectors. A first connector is an analog connector, while a second connector is a digital connector. In one embodiment, the first connector comprises three analog signal contacts. A fourth contact of the first connector is a switchable contact. One or more circuits of the electronic device can cause a switch to transition a connection to the switchable contact from a common node of the electronic device to a signal node of the electronic device.

At step 802, an accessory device is coupled to the electronic device. In one embodiment, the accessory device is a conventional accessory device having a single, four-wire connector. In another embodiment, the accessory device is the accessory device (400) of FIG. 4 that has four analog connections and a common connection.

At decision 803, the method 800 determines what type of accessory device is attached. This can be done in a variety of ways. In one embodiment, a signal detector determines whether analog signals are present at a fourth terminal of the analog connector. In another embodiment, a near field communication circuit can determine whether the accessory device is proximately located with the electronic device. In another embodiment, a near field communication circuit can determine whether a unique type of connector is attached to the analog connector. In another embodiment, detection of a unique contact type can occur at the analog connector.

Other techniques for determining the type of accessory device coupled to the device at decision 803 include electrical techniques, communication techniques, or manual techniques. With electrical techniques, the device can query the fourth contact of the accessory device connector to determine whether it is connected to ground. With communication techniques, communication protocols such as Bluetooth.Sup.™, Near Field Communication (NFC) technologies, Wi-Fi, and so forth could be employed so that the accessory device could inform the device of the type of connector it employs. Using manual techniques, a user could use a user input device, such as the touch-sensitive display (101) of FIG. 1, to tell the control circuit of the device what type of accessory device was coupled to the device. Other techniques will be obvious to those of ordinary skill in the art having the benefit of this disclosure.

Where the accessory device is a four-wire accessory device, a switch switches a fourth contact of the analog connector to a common node at step 804. Where the accessory device is a five-wire device, a switch switches a fourth contact of the analog connector to a signal node at step 804.

Figure 9:
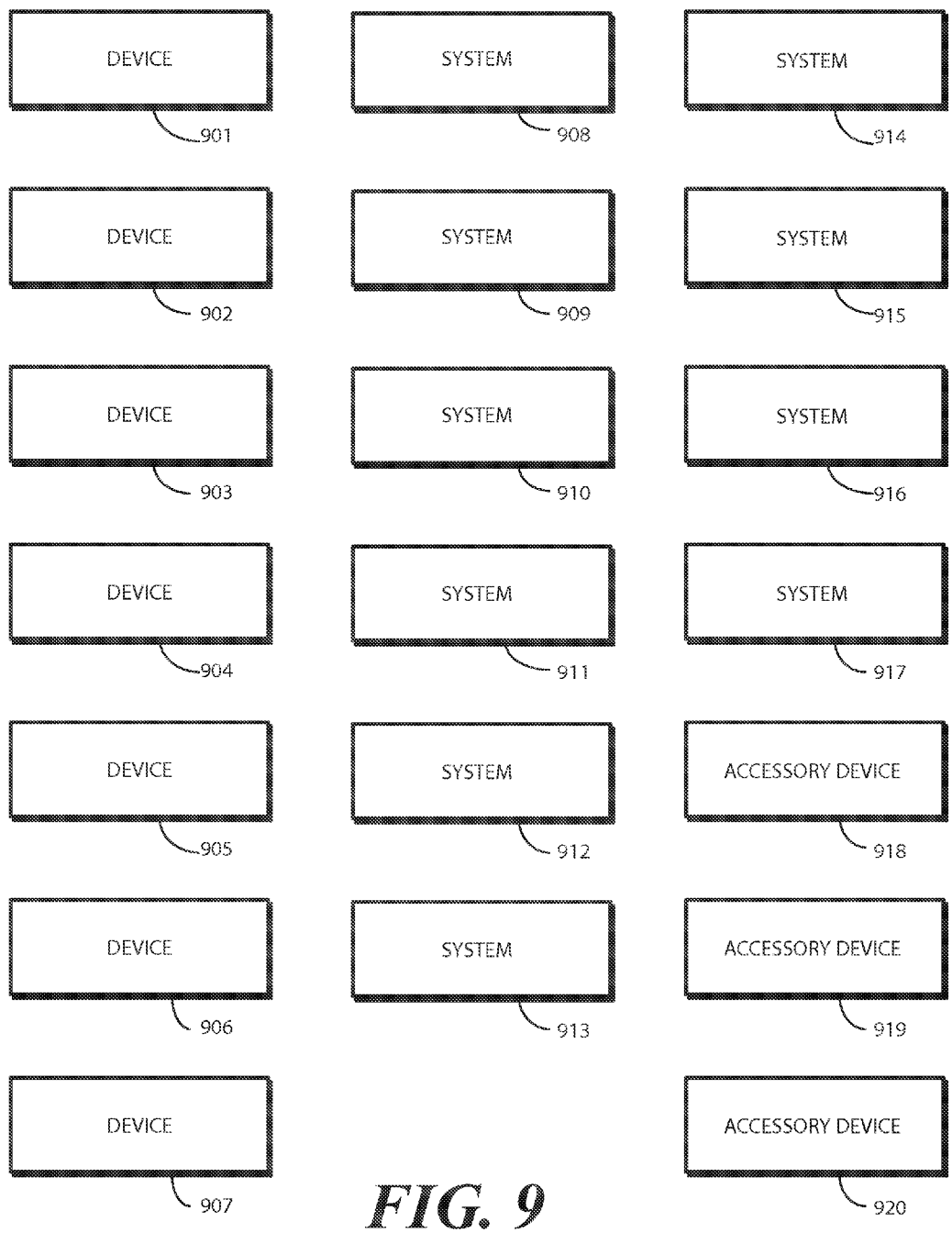
FIG. 9 illustrates various embodiments of the disclosure.

Turning now to FIG. 9, illustrated therein are various embodiments of the disclosure. At 901, a device comprises an analog connector comprising one or more analog signal contacts and at least one other contact. At 901, the device comprises a signal detector coupled to the at least one other contact. At 901, a switch is coupled to the at least one other contact. At 901, a control circuit is operable with the signal detector and the switch to detect analog signals at the at least one other contact and, where the analog signals are at the at least one other contact, to cause the switch to transition a connection to the at least one other contact from a common node of the device to a signal node of the device.

At 902, the control circuit of 901 is to cause the switch to connect the at least one other contact to the common node whenever analog signals are not at the at least one other contact. At 903, the "at least one other contact" comprises a single contact. At 904, the one or more analog signal contacts comprise three analog signal contracts. At 905, the analog connector of 901 comprises a female 3.5-millimeter jack. At 906, the signal node of 901 comprises an audio input node.

At 907, the device of claim 1 further comprises a digital connector. In one embodiment, the digital connector of 907 is separate from the analog connector of 901. In one embodiment, the digital connector of 906 comprises a micro-USB connector.

At 908, a system comprises a device. At 908, the device includes an analog connector, a digital connecter separate from the analog connector, and one or more circuits. In one embodiment, the one or more circuits are to send or receive analog signals through the analog connector and digital signals through the digital connector. At 908, the system can also have an accessory device comprising an analog audio connector comprising a plurality of analog contacts and a common contact. In one embodiment, the accessory device is to couple to the device with the plurality of analog contacts coupled to one or more contacts of the analog connector and the common contact coupled to another common contact of the digital connector.

At 909, the analog audio connector of 908 comprises five contacts. In one embodiment, the plurality of analog contacts comprises four of the five contacts and the common contact comprises one of the five contacts. At 910, four of the five contacts comprise two loudspeaker contacts and two microphone contacts.

At 911, the analog audio connector of 908 comprises a first connector and a second connector separable from the first connector. At 912, the system of 908 further comprises an adapter. In one embodiment, the adapter includes a first connector to couple to the analog connector, a second connector to couple to the digital connector, and a third connector to couple to the analog audio connector. At 913, the adapter of 912 is coupled between the accessory device and the device.

At 914, the device of 908 further includes a switch coupled to a switchable contact of the analog connector. At 914, the one or more circuits of 908 are to cause the switch to transition a connection to the switchable contact from a common node to a signal node. At 915, the one or more circuits are to cause the switch to transition the connection when the plurality of analog contacts is coupled to the analog connector. At 916, the device of 908 further includes a detector, operable with the one or more circuits to detect the accessory device. At 916, the one or more circuits of 908 are to cause the switch to transition the connection when the detector detects the accessory device. At 917, the detector comprises a near field communication circuit.

At 918, an accessory device comprises a first connector to couple to an analog connector of another device. At 918, the accessory device comprises a second connector, separate from the first connector, where the second connector is to couple to a digital connector of the other device. At 918, the accessory device includes a third connector comprising a plurality of contacts coupled to the first connector and a common contact coupled to another common contact of the digital connector.

At 919, the first connector of 918 comprises only audio signal contacts, with each audio signal contact coupled to a corresponding audio signal contact of the third connector on a one to one basis. At 919, the second connector comprises only common contacts, with the only common contacts coupled to the common contact of the third connector. At 920, the accessory device of 918 is configured as a case to at least partially surround the device.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A device, comprising:
   an analog connector comprising one or more analog signal contacts and at least one dual contact;
   a signal detector coupled to the at least one dual contact;
   a switch coupled to the at least one dual contact; and
   a control circuit operable with the signal detector and the switch to, based on the signal detector detecting analog signals from an accessory device at the at least one dual contact, cause the switch to transition a connection to the at least one dual contact from a ground node of the device to a signal node of the device.

2. The device of claim 1, wherein the control circuit is configured to cause the switch to connect the at least one dual contact to the ground node whenever analog signals are not at the at least one dual contact.

3. The device of claim 2, the at least one dual contact comprising a single contact.

4. The device of claim 3, the one or more analog signal contacts comprising three analog signal contacts.

5. The device of claim 4, the analog connector comprising a 3.5-millimeter jack.

6. The device of claim 1, the signal node comprising an audio input node.

7. The device of claim 1, further comprising a digital connector, separate from the analog connector, the digital connector comprising a micro-USB connector.

8. A system, comprising:
   a device, comprising:
   a switch;
   an analog connector comprising a switchable contact coupled to the switch;
   a digital connector, separate from the analog connector; and
   one or more circuits to:
     cause the switch to transition a connection of the switchable contact from a ground node to a signal node based on the analog connector coupling to a plurality of analog contacts; and
     send or receive:
       analog signals through the analog connector; and
       digital signals through the digital connector; and
   an accessory device comprising an analog audio connector comprising the plurality of analog contacts and a ground contact, the accessory device to couple to the device with:
     the plurality of analog contacts coupled to one or more contacts of the analog connector; and
     the ground contact coupled to another ground contact of the digital connector.

9. The system of claim 8, wherein:
   the analog connector comprises five contacts,
   and the plurality of analog contacts comprises four of the five contacts of the analog connector and the ground contact comprises a fifth of the five contacts of the analog connector.

10. The system of claim 9, wherein the four of the five contacts comprise two loudspeaker contacts and two microphone contacts.

11. The system of claim 8, wherein the analog connector comprises a first connector and a second connector separable from the first connector.

12. The system of claim 8, further comprising an adapter, the adapter comprising:
   a first connector to couple to the analog connector;
   a second connector to couple to the digital connector; and
   a third connector to couple to the analog audio connector.

13. The system of claim 12, wherein the adapter is coupled between the accessory device and the device.

14. The system of claim 8, wherein the one or more circuits are configured to cause the switch to transition the connection when the plurality of analog contacts is coupled to the analog connector.

15. A system, comprising:
a device, comprising:
a switch;
an analog connector comprising a switchable contact coupled to the switch;
a digital connector, separate from the analog connector;
a detector operable to detect an accessory device; and
one or more circuits to:
cause the switch to transition a connection of the switchable contact from a common node to a signal node based on the detector detecting the accessory device; and
send or receive:
analog signals through the analog connector; and
digital signals through the digital connector; and
the accessory device comprising an analog audio connector comprising a plurality of analog contacts and a common contact, the accessory device to couple to the device with:
the plurality of analog contacts coupled to one or more contacts of the analog connector; and
the common contact coupled to another common contact of the digital connector.

16. The system of claim 15, wherein the detector comprises a near field communication circuit.

17. An accessory device comprising:
a case to at least partially surround another device;
a first connector to couple to an analog connector of the another device, the first connector comprising only audio signal contacts, with each audio signal contact being coupled to a corresponding audio signal contact of a third connector on a one-to-one basis;
a second connector, separate from the first connector, the second connector being configured to couple to a digital connector of the another device, the second connector comprising only common contacts, the only common contacts being coupled to a ground contact of the third connector; and
a third connector comprising a plurality of contacts coupled to the first connector and a ground contact coupled to another ground contact of the digital connector.

* * * * *